(12) United States Patent
Zehfuss

(10) Patent No.: US 9,403,550 B2
(45) Date of Patent: Aug. 2, 2016

(54) SEAT ATTACHMENT FOR A STROLLER

(71) Applicant: Mark Zehfuss, Glen Allen, VA (US)

(72) Inventor: Mark Zehfuss, Glen Allen, VA (US)

(73) Assignee: Baby Jogger, LLC, Richmond, VA (US)

( * ) Notice: Subject to any disclaimer, the term of this patent is extended or adjusted under 35 U.S.C. 154(b) by 0 days.

(21) Appl. No.: 14/597,420

(22) Filed: Jan. 15, 2015

(65) Prior Publication Data

US 2015/0123440 A1    May 7, 2015

Related U.S. Application Data

(63) Continuation of application No. 14/261,558, filed on Apr. 25, 2014, now Pat. No. 8,955,869, which is a continuation of application No. 12/631,375, filed on Dec. 4, 2009, now abandoned.

(60) Provisional application No. 61/119,920, filed on Dec. 4, 2008.

(51) Int. Cl.
| | |
|---|---|
| *B62B 9/28* | (2006.01) |
| *B62B 7/00* | (2006.01) |
| *B62B 7/14* | (2006.01) |
| *B62K 13/00* | (2006.01) |
| *B62B 3/00* | (2006.01) |

(52) U.S. Cl.
CPC . *B62B 9/28* (2013.01); *B62B 7/006* (2013.01); *B62B 7/008* (2013.01); *B62B 7/14* (2013.01); *B62B 3/008* (2013.01); *B62B 7/145* (2013.01); *B62K 13/00* (2013.01)

(58) Field of Classification Search
CPC ............ B62B 7/00; B62B 7/008; B62B 7/14; B62B 7/142; B62B 9/102; B62B 9/12

USPC ......... 280/650, 657, 647, 648, 658, 639, 642, 280/643; 297/130, 232, 243, 463.1
See application file for complete search history.

(56) References Cited

U.S. PATENT DOCUMENTS

| | | | | |
|---|---|---|---|---|
| 4,542,915 | A * | 9/1985 | Wheeler, III | B62B 7/08 280/47.39 |
| 6,045,145 | A | 4/2000 | Lan | |
| 6,209,892 | B1 * | 4/2001 | Schaaf | B62B 7/145 280/33.993 |
| 6,286,844 | B1 * | 9/2001 | Cone et al. | 280/47.41 |
| 6,513,827 | B1 | 2/2003 | Barenbrug | |
| 6,851,693 | B2 | 2/2005 | Haeggberg | |
| 6,923,467 | B2 | 8/2005 | Hsia | |
| 7,249,779 | B2 | 7/2007 | Ehrenreich et al. | |
| 7,320,471 | B2 | 1/2008 | Maciejczyk | |
| 7,367,581 | B2 | 5/2008 | Yang | |
| 7,377,537 | B2 * | 5/2008 | Li | 280/650 |
| 7,401,803 | B1 * | 7/2008 | Lai | B62B 7/08 280/47.38 |
| 7,475,900 | B2 * | 1/2009 | Cheng | B62B 7/08 280/47.38 |

(Continued)

*Primary Examiner* — James M Dolak

(74) *Attorney, Agent, or Firm* — Sutherland Asbill & Brennan LLP

(57) ABSTRACT

The invention relates to a seat attachment for a stroller, single stroller and double strollers. The seat attachment includes left and right seat attachment portions, wherein the seat attachment portion comprise a connector portion capable of removably connecting to a stroller frame and a left seat support element removably connecting a seat in either a forward or backward position More specifically, versions of the seat attachment relate to a seat attachment for a stroller capable of supporting a seat such as, but not limited to, a stroller seat, a baby seat, bassinet, a pram, a car seat, or a baby carrier, for example.

7 Claims, 10 Drawing Sheets

(56) References Cited

U.S. PATENT DOCUMENTS

| | | |
|---|---|---|
| 7,481,439 B2 | 1/2009 | Thompson |
| 7,497,461 B2 | 3/2009 | Emerson |
| 7,766,366 B2 | 8/2010 | Li |
| 7,938,435 B2 | 5/2011 | Sousa et al. |
| 8,029,007 B2 | 10/2011 | Jones et al. |
| 8,029,014 B2 * | 10/2011 | Ahnert et al. ............ 280/650 |
| 8,882,134 B2 * | 11/2014 | Rolicki et al. ............ 280/647 |
| 8,905,427 B2 * | 12/2014 | Katz et al. ............ 280/648 |
| 8,936,261 B2 * | 1/2015 | Yuan ............ 280/47.38 |
| 9,010,773 B2 * | 4/2015 | Horst et al. ............ 280/47.38 |
| 9,108,654 B2 * | 8/2015 | Kozinski |
| 9,108,659 B2 * | 8/2015 | Sparling |
| 9,119,483 B1 * | 9/2015 | Heisey |
| 9,199,659 B2 * | 12/2015 | Chen et al. |
| 9,200,746 B2 * | 12/2015 | Xiao |
| 9,227,650 B2 * | 1/2016 | Gillett ............ B62B 7/12 |
| 9,242,665 B2 * | 1/2016 | Offord ............ B62B 7/105 |
| 9,260,127 B2 * | 2/2016 | Rolicki ............ B62B 7/04 |
| 9,260,128 B2 * | 2/2016 | Liu ............ B62B 7/08 |
| 2001/0033069 A1 | 10/2001 | Ivers |
| 2006/0001226 A1 | 1/2006 | Refsum |
| 2006/0131841 A1 | 6/2006 | Huang |
| 2006/0290107 A1 * | 12/2006 | Powers ............ B62B 7/06 280/658 |
| 2007/0090619 A1 | 4/2007 | Lundh |
| 2008/0224451 A1 | 9/2008 | Vegt |
| 2008/0231022 A1 | 9/2008 | Hu et al. |
| 2009/0302578 A1 * | 12/2009 | White ............ B62B 7/145 280/642 |

* cited by examiner

SEAT ATTACHMENT FOR A STROLLER

RELATED APPLICATIONS

This U.S. patent application claims priority under 35 U.S.C. §120 to U.S. patent application Ser. No. 14/261,558 filed on Apr. 25, 2014 which claims priority to U.S. patent application Ser. No. 12/361,375 filed on Dec. 4, 2009 which claims priority to U.S. Provisional Patent Application Ser. No. 61/119,920 filed on Dec. 4, 2008 which are all hereby incorporated by reference in their entirety.

TECHNICAL FIELD

The invention is directed to a seat attachment for a stroller, single stroller and double strollers. Such a seat attachment may be used to convert a single stroller into a double stroller. More specifically, embodiments of the invention are directed to a seat attachment for a stroller capable of supporting a seat such as, but not limited to, a stroller seat, a baby seat, bassinet, a pram, a car seat, or a baby carrier, for example. Embodiments of the seat attachment are capable of reversibly converting a single stroller into a double stroller.

BACKGROUND

Parents with multiple young children may have difficulty transporting their children from place to place. Children are slow, easily distracted and, therefore, may lag behind their parents while the parents are trying to complete shopping tasks or get exercise in a limited amount of time. In response, many parents have purchased double strollers allowing the parent or other guardian to push two children simultaneously and thus allow them to more efficiently run errands, take walks, or jog. As such, a double stroller allows the parents or guardians more freedom than they would have with only a single stroller, especially while trying to manage two sleeping children.

Though double strollers have certain advantages, double strollers also have disadvantages. Double strollers are substantially larger than single strollers and are, therefore, more difficult to maneuver through doors and down aisles in stores. Typically, the benefits of being able to accommodate two children greatly offset these disadvantages. However, when the parent or guardian has only one child with them, the benefits of the double stroller are not realized but the disadvantages still exist.

Therefore, parents often buy two or more strollers to use at different times; a single stroller for times when they only have one child with them and a double stroller for when they need a stroller that will accommodate two children. This often creates its own set of problems. The multiple strollers must be stored and there is seldom room for both a folded double stroller and a folded single stroller in the trunk of a typical car or back of a sport utility vehicle.

Stroller manufacturers have attempted to solve this problem by providing a place for a second child to stand on the back of a single stroller or attachments that provide another seat for the second child that hangs under and slightly behind the seat of the single stroller. This provides a second seat for a child but the child is tucked close to the back of the front seat which may be uncomfortable, reduce the capacity of the under seat storage, and prevent the parent from hanging a bag on the handle bars.

There exists a need for a single stroller that may be conveniently converted to a double stroller. There is also a need for a conversion kit that converts the single stroller into a full double stroller that is capable of accommodating two children without loss of convenience for the parent or guardian.

SUMMARY OF THE INVENTION

Strollers are typically single strollers (strollers having one seat for transporting one child) or may also be double strollers (strollers having two seats for transporting two children). Embodiments of the invention are directed to a seat attachment for a stroller comprising a connector portion capable of connecting directly to a stroller frame or to an attachment frame member connected to the stroller frame; and a seat support element capable of supporting a seat. In certain embodiments, the attachment for a stroller comprises an attachment frame member having a first end and a second end. The first end may be capable of connecting the seat attachment to a stroller frame and the second end may be capable of connecting to the seat support element. The seat support element is thus capable of supporting a seat on the stroller. In more specific embodiments, the seat may be supported in either a forward or backward position.

Another embodiment comprises a stroller and seat attachment for the stroller, wherein the stroller comprises an attachment frame member connected to the frame of the stroller and the seat attachment for the stroller comprises a connector portion. The attachment frame member and the connector portion comprise components that are capable of being securely connected together. In certain embodiments, the attachment frame member and the connector portion comprise components that are capable of being securely and releasably connected together. In this manner, the seat attachment may be attached to the stroller and a seat, as defined above, may be connected to the seat attachment, thus reversibly converting the single stroller into a double stroller.

In a further embodiment, the seat attachment for the stroller further comprises at least one wheel. The wheel may be connected to the seat attachment by a wheel support frame which may be rigidly attached or may be pivotally attached to the seat attachment. The wheel support frame may be connected to any section of the seat attachment, preferably the wheel support frame is pivotally connected to the back portion of the seat attachment in an area adjacent to the connector portion or connected near the middle of the attachment portion.

Embodiments of the seat attachment for a stroller may further comprise a folding mechanism. The folding mechanism may comprise a sliding member slidingly connected to the attachment portion and a folding frame member or strut having a first end connected to the sliding member and a second end connected to the wheel support frame. The folding mechanism allows the wheel support frame to pivot from a first position (in-use position), to a second position (a folded position). The attachment for the stroller also may comprise a locking mechanism that secures the attachment to a stroller in the in-use position and unlocks the attachment to allow the attachment to be connected or removed from the stroller when in the folded position. The locking mechanism may be a small protrusion attached to the wheel support frame that engages a corresponding aperture in the stroller or the stroller attachment portion to secure the attachment to the stroller. In the folded position, the protrusion is not engaged in the aperture.

A further aspect is directed to a double stroller. The double stroller may comprise a frame, wherein the frame comprises a handle portion, a front wheel support portion, a back wheel support portion, and a folding mechanism. Embodiments of the double stroller comprise a stroller frame comprising wheels, the frame, a first seat and a connector portion connected to the frame. The double stroller may further comprise a seat attachment frame comprising a wheel, a second seat, and a second attachment portion capable of connecting to the connector portion of the stroller frame. The second attachment portion may be releasably connected to the connector portion. Further, the second seat may be releasably connected to the seat attachment frame and is capable of supporting the second seat in either a forward or backward position.

A further embodiment of the double stroller comprises a first seat attachment capable of releasably supporting a first child seat and a second seat attachment capable of releasably supporting a second child seat. The seat attachments may comprise two seat connector portions for supporting the seat on both sides.

A still further embodiment of the double stroller comprises at least one first seat attachment adjacent to the front wheel support portion and a second seat attachment adjacent to each folding mechanism and/or the handle portion. The first seat attachment may be above at least one front wheel connected to the wheel support portion.

A still further embodiment of the stroller comprises a frame, at least one front wheel, at least one rear wheel, a first stroller seat with at least one first attachment portion permanently attached to the frame; and at least one releasably connected second seat attachment portion capable of supporting a second seat in front of the first stroller seat. As in other embodiments, the seat attachment may comprise two seat connectors. Either or both seat attachment portions may be a single part with two seat connectors or two separate pieces each comprising a seat connector.

In any of the above embodiments, the stroller, double stroller or attachment may comprise one or more of the following features; a sleeve for removably receiving the attachment portion. The seat attachment portion may comprise a protrusion having a complementary shape to the sleeve for inserting into the sleeve. Further, the second seat may be integral to the seat attachment.

Aspects of the stroller, double stroller and attachment are presented in various embodiments, however one skilled in the art will understand various variation and interchangeability of the components of the various embodiments which are intended to be included in the scope of the invention.

DESCRIPTION

The invention relates to an accessory, attachment, or conversion kit (hereinafter "seat attachment") for a stroller. As discussed above, parents or guardians may find themselves in a situation wherein it is more convenient to transport two children in a stroller, but at the same time find it inconvenient to have both a single stroller and double stroller. Embodiments of the seat attachment solve this problem. In one aspect, an embodiment of the seat attachment for a stroller is capable of converting a single stroller into a double stroller. The seat attachment may support a seat such as, but not limited to, a stroller seat, a baby seat, a bassinet, a pram, a baby carrier, or a car seat, for example. Therefore, the parent or guardian does not require both a single stroller and a double stroller. A stroller configured to receive a seat attachment for converting a single stroller into a double stroller provides convenience to the user. The single stroller may be connected to a double stroller by attaching the seat attachment to the single stroller and then attaching the second seat. As such, an embodiment of the seat attachment for converting a single stroller into a double stroller comprises at least one connector portion capable of connecting to a stroller frame and a seat support element capable of supporting a seat. The seat attachment may optionally comprise at least one wheel for additional support and stability, however, for more convenience, embodiments of the attachment do not include a wheel. In certain embodiments, a wheel may stabilize the double stroller, but in other embodiments of the attachment the wheel may not be desirable or necessary. Additional embodiments of the attachment comprise a cart, wagon, tricycle-like attachment, or other riding toy that may be connected to the stroller, for example. A tricycle-like attachment would allow a child to ride or be pushed in front of the stroller.

Figure 1:
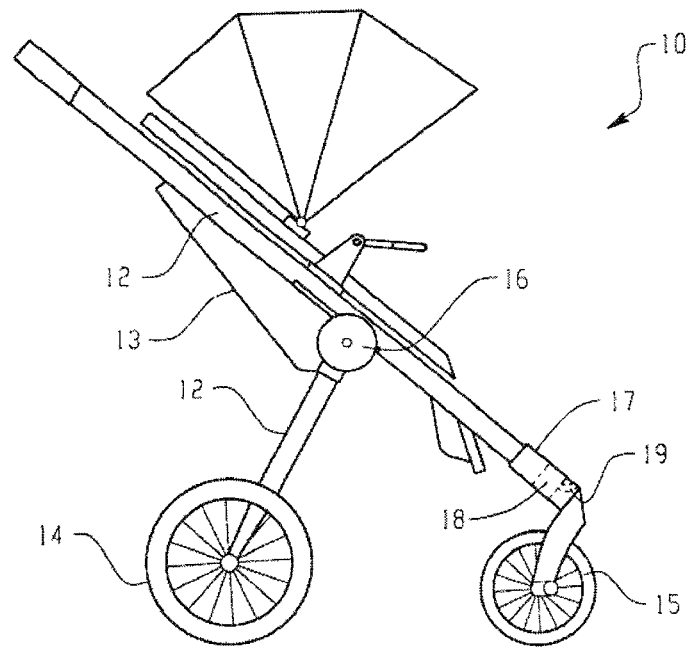
FIG. 1 shows an embodiment of a single stroller.

A side view of an embodiment a single stroller 10 is shown in FIG. 1. As a note, FIG. 1 shows only one side of the single stroller 10, however, most components include a complementary component on the other side of the single stroller but are not shown in FIG. 1. The single stroller 10 comprises a frame 12 that supports seat 13. The frame 12 may, optionally, include at least one, preferably two, folding mechanism 16 that allows the stroller 10 to be folded to a more convenient size for storing or transporting the stroller 10.

In this embodiment, the seat 13 is shown as a typical stroller seat, however, other types of seats may be used in a single stroller. The seat 13 may be permanently affixed to the frame 12 or releasably connected such that it is capable of being removed and substituted with a different seat. As used herein, "releasably connected" or "releasably attached" means the connection is not a permanent connection and that the connection is capable being of connected and disconnected by the user of the stroller without requiring special tools or special skills. Releasable connections include, but are not limited to, buttons, snaps, friction fittings, interference fits, threaded connections, locking tabs, keyed connections, other fasteners, or the like. On stroller 10 of FIG. 1, the frame 12 is supported on a pair of back wheels 14 and a pair of front wheels 15. In this embodiment, back wheels 14 are fixed and do not swivel or pivot on the frame. The pair of front wheels 15 on the single stroller 10 pivot to make turning the single stroller 10 easier and more convenient. Though, pivoting wheels may be preferred in certain strollers, strollers with fixed non-pivoting wheels are also common. It should be noted that a single stroller does not require pairs of front or rear wheels and either the front pair of wheels 15 or the back pair of wheels 14 may be substituted with a single wheel. Conventionally, many single strollers, including umbrella strollers, jogging strollers, all-terrain strollers, as well as other strollers may only include one front wheel. Embodiments of the seat attachment of the invention may be capable of converting any style of stroller to a double stroller, including strollers with one or two front wheels.

Figure 3:
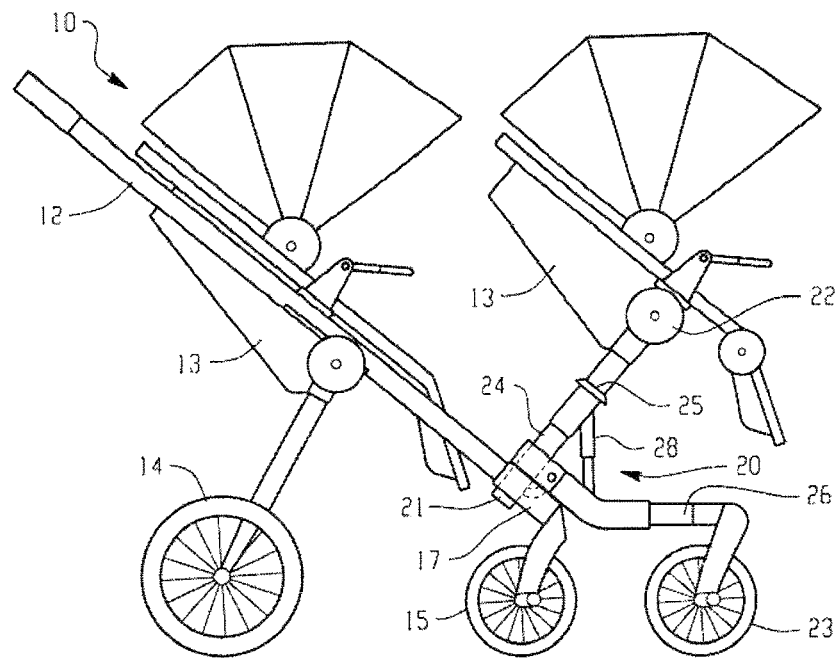
FIG. 3 shows the combination of the single stroller of FIG. 1 attached to the seat attachment of FIG. 2.

The embodiment of the stroller 10 comprises two attachment portions 17. The connector portions are preferably on the front of the stroller to allow the seat attachment and the seat to be connected to the front of the stroller 10. The attachment portions 17 allow a seat attachment such as the seat attachment for converting the single stroller 10 to a double stroller, as shown in FIG. 3, to be connected to the stroller. Only one seat attachment is shown in FIG. 3, the stroller 10 would use two seat attachments as shown in FIG. 3 or one seat attachment comprising two seat support elements. The embodiment of the stroller 10 has a left side and right side attachment portions 17. An embodiment of a seat attachment of stroller 10 will comprise corresponding connector portions capable of connecting to the stroller frame at the attachment portions 17. Though the seat attachment for the stroller is described in relation to a single stroller, the attachment may similarly be attached to a double stroller. Embodiments of the seat attachment may therefore be used to convert a double stroller into a triple stroller, if desired.

Figure 2:
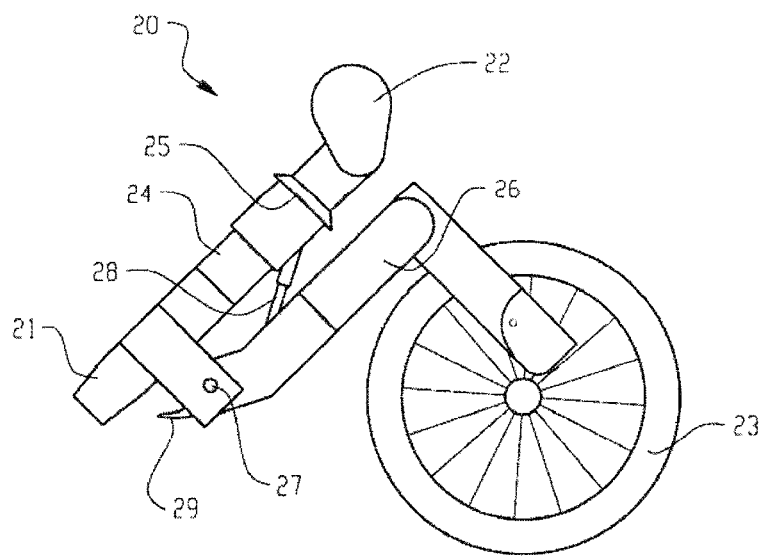
FIG. 2 shows an embodiment of a seat attachment to convert a single stroller into a double stroller.

An embodiment of a seat attachment 20 of the invention is shown in FIG. 2. The seat attachment of FIG. 2 is in an unlocked and folded configuration. The seat attachment 20 comprises a pair of connector portions 21 capable of connecting to the attachment frame members 24, two seat attachment elements 22 capable of supporting a seat; and a wheel 23. In this embodiment, the connector portions are connected to the rear of the seat attachment 20 allowing the seat attachment 20 to be connected to the front of a stroller, such as stroller 10 shown in FIG. 1. Other embodiments of the seat attachment may include more than one wheel, one connector portion, one seat support element, or combinations of these elements. In an embodiment of the stroller with one wheel, the attachment frame member may be on the forks of the front wheel, for example.

The seat attachment 20 comprises a wheel support frame 26 connecting the wheel 23 to the attachment frame member 24 of the attachment 20. Each attachment frame member 24 has a first and a second end. The first end is capable of connecting to a stroller frame and the second end is connected to the seat support element 22. The embodiment of the seat attachment 20 comprises a wheel support frame 26 that is pivotally connected to two attachment frame members 24. The wheel support frame 26 or the attachment frame 24 may span the width of the stroller between the two attachment portions 17. The pivotal connection 27 allows the seat attachment to be folded and conveniently stored or transported but is not necessary for the invention. The pivotal connection is optional and provides more convenience, however, embodiments of the attachment may comprise a releasably connected wheel support frame or a rigid frame that may be incorporated to produce a seat attachment that has greater strength for use in situations wherein a stronger seat attachment may be desired such as with all-terrain or jogging strollers, for example. The wheel support frame may be connected at any point on the attachment frame, preferably the wheel support frame is connected near the connector portion 21 or near the middle of the attachment frame 24.

An embodiment of the seat attachment without a wheel may include connector portion 21 or attachment frame member 24, and seat attachment member 22, for example. In such an embodiment, there would be no need for pivotal connection 27, wheel support frame 26, sliding connector 25, or wheel 23. FIG. 1A shows a top view of an embodiment of an attachment portion and FIG. 2A shows a cross-sectional view of an embodiment of a connector portion The seat attachment 20 comprises a folding mechanism comprising a sliding connector 25 connected to a first end of strut 28. A second end of strut 28 is pivotally connected to wheel support frame 26. In such an embodiment, the sliding connector 25 may be moved between a first position and a second position on the attachment frame member 24. As the sliding connector 25 is moved, strut 28 pushes the wheel support frame 26 from an in-use position to a storage position. The storage position is more compact as shown in FIG. 2. In addition, the embodiment of the seat attachment 20 comprises a locking mechanism 27 that is capable of securing the seat attachment 20 to a stroller, such as stroller 10 shown in FIG. 1. The locking mechanism 29 is engaged by moving the sliding connector 25 to the in-use position in which the wheel support frame 28 and wheel 23 are extended. In an embodiment of the seat attachment 20 for the stroller 10, the wheel of the seat attachment 20 is pivotally connected to the connector portion and when the wheel is in the in-use position the releasable connection is locked and when the wheel 23 is moved to the storage position, the releasable connection is unlocked allowing the seat attachment 20 to be removed from stroller 10. The seat attachment 20 may be stored and stroller 10 may be conveniently used as a single stroller. As designed, the seat attachment 20 may be reconnected to stroller 10 for use as a double stroller. In any embodiment of the invention, the seat attachment portion may be secured into position on the stroller frame and a locking mechanism may be used with an embodiment with or without the wheel. Either the seat attachment or the stroller frame may comprise a locking mechanism for securing the stroller and seat attachment together. The locking mechanism may be any mechanism capable of securing the components together during use and may be a friction locking device, threaded connection, peg in a hole, or an interference locking device such as a pin in a hole or, for example. In embodiment 20 shown in FIG. 2, the locking mechanism 29 pivots with wheel support frame 26 as the attachment 20 is moved from an unfolded position to a folded position. The locking mechanism 29 may slide into a hole or notch in the attachment frame member of stroller 10 shown in FIG. 1. As such, the attachment 20 may be attached to stroller 10 by positioning attachment portion 21 of attachment 20 in slot 18 of attachment portion 17 of stroller 10. The sliding connector 25 may be moved to the in-use position, wheel support frame is moved and locking mechanism 29 is positioned into locking slot 19 of stroller 10.

The connector portion 21 of the embodiment of the seat attachment 20 has a cylindrical shape. The connector portion 21 may be inserted into a cylindrical slot 18 of the attachment portion 17 of stroller 10 of FIG. 1 to secure the seat attachment and convert the single stroller into a double stroller, as shown in FIG. 3. Other embodiments of the seat attachment may include any type of connector portion. The connector portion may be of a solid or tubular construction and may be any cross-sectional shape including, but not limited to, circular, polygonal, square, rectangular, and triangular, for example. Other attachment mechanisms may be utilized to connect the seat attachment to the stroller such as, but not limited to, a U-shaped bracket, a U-bolt, a pipe clamp, O-shaped bracket, screw, bolt, or other clamping or attachment means. The attachment frame member of the stroller has a complimentary and cooperating shape that allows the connector portion to be secured to the attachment portion of the stroller.

In FIG. 3, the seat attachment 20 of FIG. 2 is shown connected to the single stroller 10 of FIG. 1 forming a double stroller. The double stroller configuration is shown with two stroller seats 13 in an inline configuration, though the other configurations, such as a stroller seat and a bassinet or a pram may also be supported on the double stroller. Further, the seat support element of the seat attachment may be capable of supporting the front stroller seat in either a forward or backward position.

The embodiment of the stroller 10 is shown only as an example of one type of stroller, the frame of the stroller may be any of many possible configurations. Embodiments of the accessory of the invention may be configured to be used on any such configuration of a stroller. For example, a different embodiment of the baby stroller may not include two front wheels, may not include a folding mechanism or may only include only one folding mechanism. In addition, the baby stroller may include additional features not included in baby stroller 10. For example, the stroller may optionally comprise fixed front wheels, an entirely different frame configuration, or a storage basket underneath the seat of the stroller.

Figure 4:
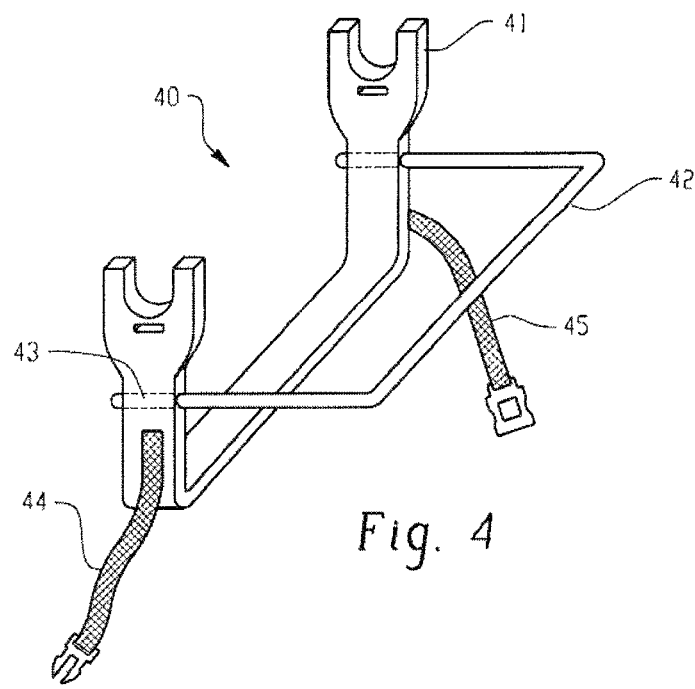
FIG. 4 shows an embodiment of a seat attachment capable of supporting a car seat on an attachment of FIG. 2.

The seat support member may be any configuration capable of supporting the seat on the seat attachment. Another embodiment of a seat support member for use with a car seat or other baby seat is shown in FIG. 4. The embodiment of the seat support member 40 of FIG. 4 comprises a main support 41. The main support 41 comprises a cradle for supporting a central portion of the seat. Another portion of the seat may rest against support bar 42. In this embodiment, support bar 42 may be adjusted to accommodate seats of different shapes and sizes. Support bar 42 may be slid within aperture 43 and locked in place when in the desired position to support a certain seat. The seat is, therefore, supported on two main supports 41 and support bar 42. The seat may be further secured in the seat attachment member 40 by wrapping belts 44 and 45 around the seat and locking the belts in this position with a buckle or other securing means.

Figure 5:
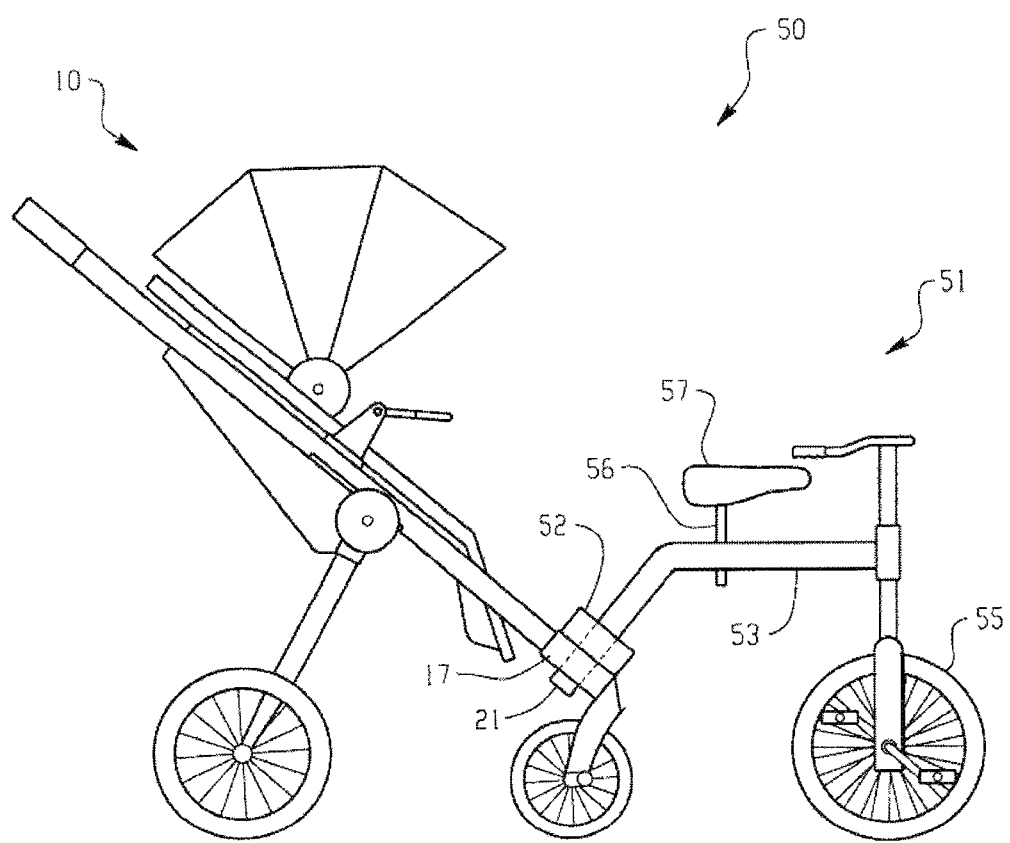
FIG. 5 shows a combination of the single stroller of FIG. 1 attached to an embodiment of the attachment in the form of a tricycle-like riding device.

Another embodiment of a seat attachment for a stroller is shown in FIG. 5. The combination 50 comprises stroller 10 and seat attachment 51. Seat attachment 51 is a tricycle-like attachment comprising a connector portion 52, a frame 53 with a seat support element 56, a seat 57, and wheel 55. The tricycle-like attachment may be attached to stroller 10 to allow one child to be pushed in the stroller 10 and one child to ride the seat attachment 51. The seat attachment may be other shapes also such as cars, trucks, or animal shapes, for example.

The embodiment of the stroller 10 of FIG. 5 comprises an additional accessory attachment portion 58. The accessory attachment portion 58 attaches to a frame member of stroller 10. An embodiment of the accessory attachment portion 58 is shown on FIG. 6A. This embodiment is particularly useful for attaching a bag or purse 64, as shown in FIG. 6B, to stroller 10.

Figure 6A:
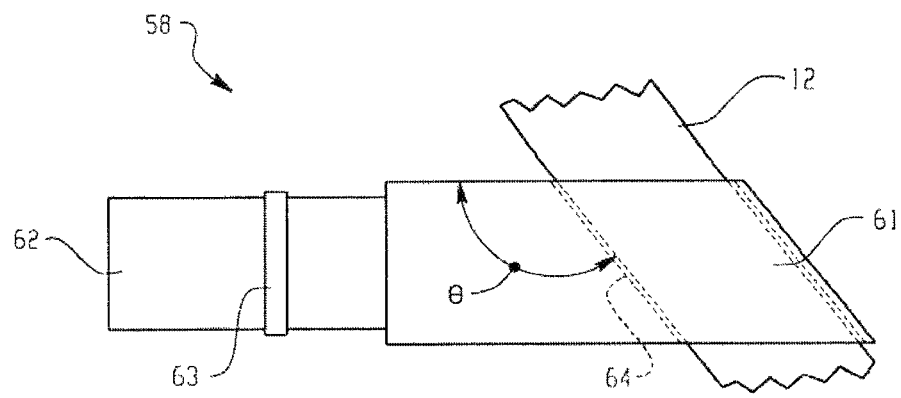
FIG. 6A shows an accessory attachment for supporting an accessory on a stroller.

When using a stroller, parents or guardians typically carry other items, such as purses, grocery bags, cell phones, diapers, cleaning wipes, or other personal or baby related items. Some strollers have bottom storage baskets for placing such items. However, these storage baskets can be inconvenient to access or some light weight strollers do not include such storage. Therefore, users of the stroller may hang purses or shopping bags on the handle of the stroller. This is convenient in that the bag is easy to access, but the weight of the bag on the handle may cause the stroller to be unbalanced and increase the tendency of the stroller to topple backwards. A heavy bag hung from the handle of a stroller may cause the stroller to tip backwards even with a child in the seat. The problem is worse if the stroller is facing uphill, on uneven terrain, being pushed up a curb, or occupied by a small child. The attachment portion may be attached to the frame of a stroller by any of the clamping or attachment methods described above, for example. Preferably, accessory attachment 58 is attached near the center of gravity of the stroller 10 to avoid creating an unbalanced condition of the stroller. An embodiment of the accessory attachment 58 is shown in FIG. 6A. Accessory attachment 58 is shown connected to stroller frame 12 of stroller 10 in FIG. 1 near the folding mechanism. Embodiments of the accessory comprise a first end 61 for connecting to a stroller frame and a second end 62 for releasably connecting to the accessory. The first end 61 comprises an aperture 64 that may be connected to frame 12 of the stroller 10. In certain embodiments, the aperture 64 is on an angle—such that when the axis of the accessory attachment portion 58 is substantially horizontal. The accessory attachment 58 may, optionally, comprise a rib for securing the accessory to the accessory attachment 58. The rib as shown in FIG. 6A may be replaced with any other locking element or securing means including a friction fitting, a screwed fitting, interference fitting, for example.

Figure 6B:
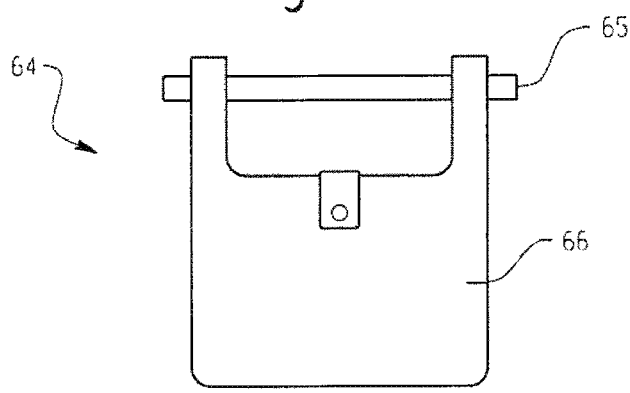
FIG. 6B shows a bag or purse for attaching to the accessory attachment of FIG. 6A.
Figure 7:
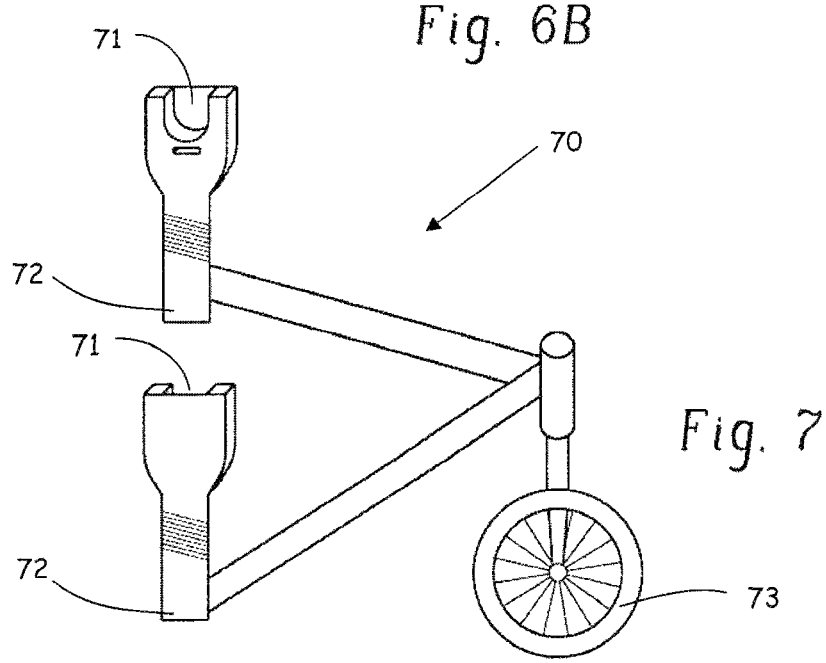
FIG. 7 shows an attachment for supporting a seat comprising one wheel.

One example of an accessory for attaching to an accessory attachment 58 is shown in FIG. 6B. The accessory is a bag or purse 64. The accessory includes an attachment portion 65 that is capable of being secured to the attachment portion 62 on the accessory attachment 58. The bag or purse 64 may be secured on stroller 10 by securing attachment portion 65 to attachment portion 62. The attachment portion 65, as shown, slides over the cylindrical attachment portion 62 of accessory attachment 58. Attachment portion 65 may include an interior annular recess that receives rib 63 securing the bag or purse 58 to stroller 10. The bag or purse 64 is thus secured to the stroller 10 in a center portion of the stroller as viewed from the side. Therefore, the bag or purse 64 is conveniently secured to stroller 10 while not contributing to an unbalanced condition of the stroller 10.

Another embodiment of the seat attachment 70 comprises two seat attachment members 71, two connector portions 72 and a wheel 73. The two seat attachment members and the wheel are in triangular relationship. The wheel 73 provides additional stability to a stroller connected to the seat attachment 70 if a heavier child is placed in a seat attached to the seat attachment members.

Figure 8:
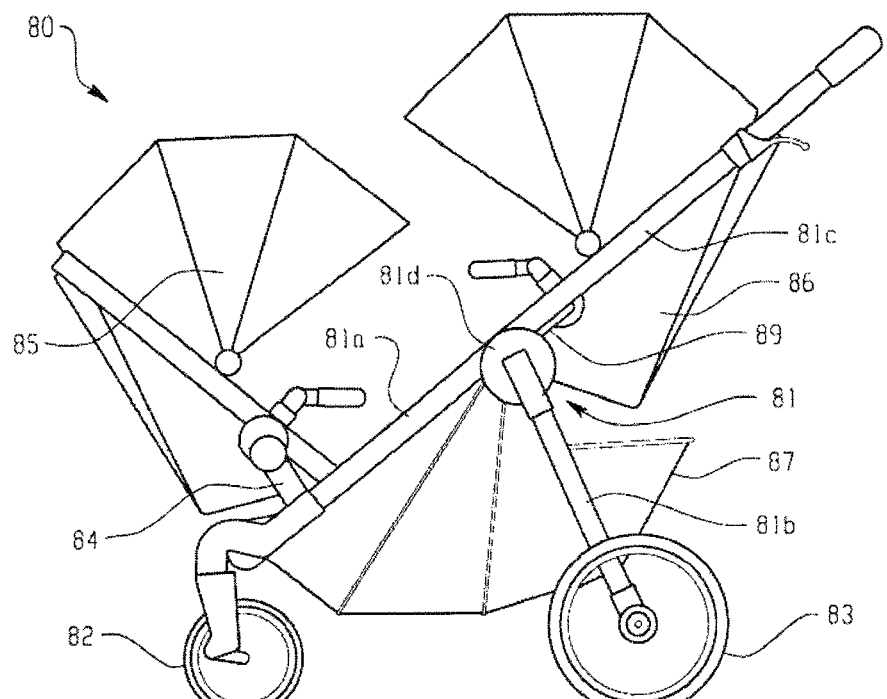
FIGS. 8 and 8A show an embodiment of a stroller that is capable of being converted from a single stroller to a double stroller comprising an attachment portion that does not comprise a wheel.
Figure 8A:
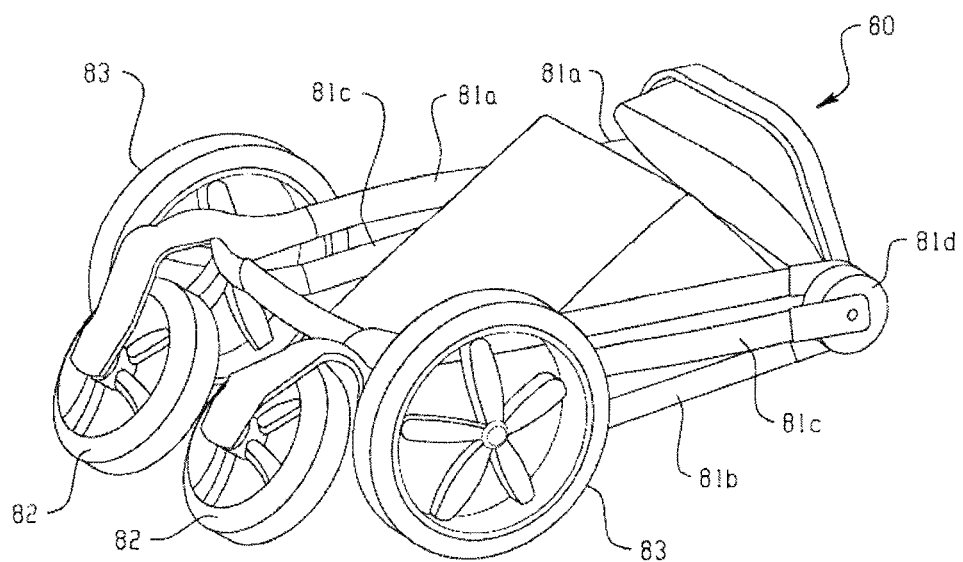

A further embodiment of the stroller 80 is shown in FIG. 8. Stroller 80 may be easily converted from a single stroller comprising one seat to a double stroller comprising two seats without addition of another wheel on the attachment. Stroller 80 comprises a frame 81 capable of supporting the stroller seat 86. In this embodiment, the frame 81 comprises a front wheel support portion 81a, a back wheel support portion 81b, and a handle portion 81c. The frame 81 of the embodiment of the stroller 80 further comprises a folding mechanism 81d that connects front wheel support portion 81a, a back wheel support portion 81b, and a handle portion 81c. The folding mechanism 81d allows the stroller to be folded in a more compact size for storing or transportation. FIG. 8A shows stroller 80 in a folded configuration.

Stroller 80 further comprises at least one front wheel 82 (both front wheels 82 of stroller 80 may be seen in FIG. 8A), at least one rear wheel 83 (both rear wheels 83 of stroller 80 may be seen in FIG. 8A), a stroller seat 86, and a seat support portion 84 capable of supporting a second seat in front of the stroller seat. The stroller 80 may further comprise a storage basket 87. Seat support portion may be of any design capable of securely supporting a seat on the stroller. For example, the seat support portion 84 may be similar to seat support portion 20 shown in FIG. 2 without the wheel 23, the strut 28, pivotal connection 27, and/or the wheel support frame 26. Preferably, the seat support portion is capable of supporting a seat such that a child in the seat is substantially above the frame of the stroller. This provides easier access to the seat, does not block access to the storage basket, allows more versatile configurations of the seats, allows more variety of seats to be attached to the frame, and allows the parent or other guardian to more easily monitor and see the child in each seat.

Figure 9A:
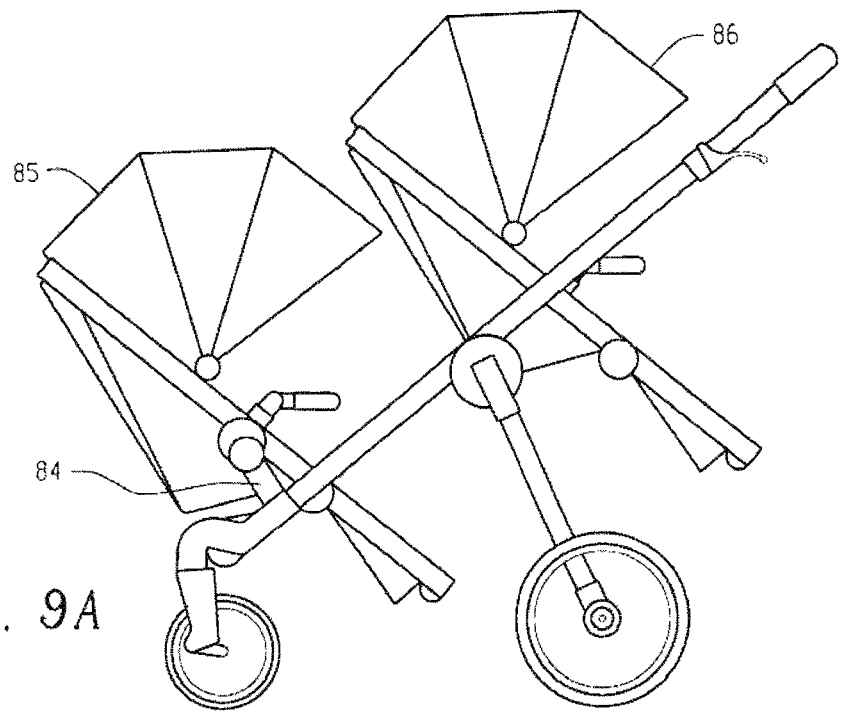
FIGS. 9A, 9B, 9C, 9D, 9E, and 9F show various configurations of the embodiments of the stroller shown in FIG. 8.
Figure 9B:
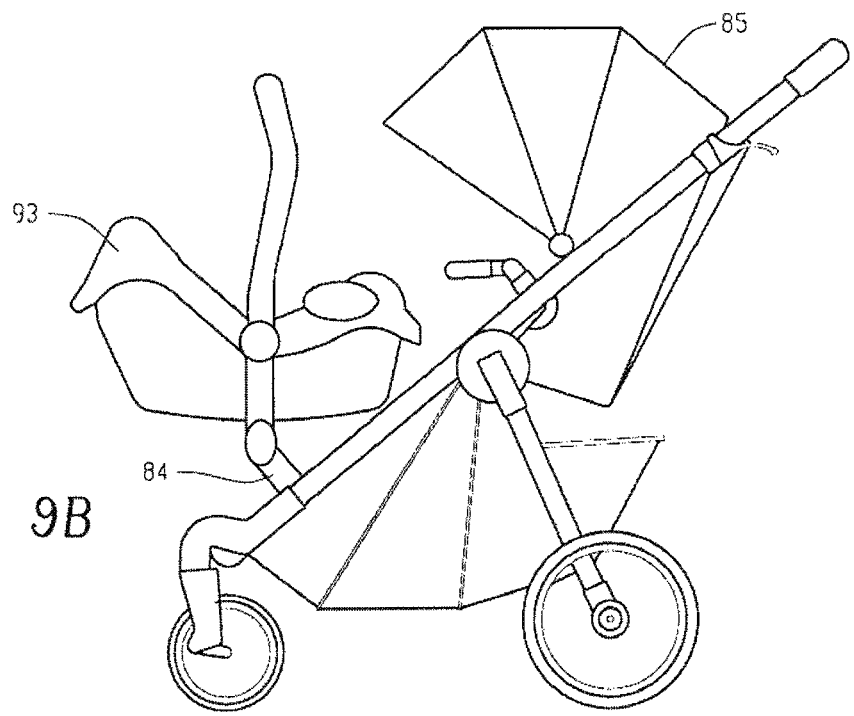
Figure 9C:
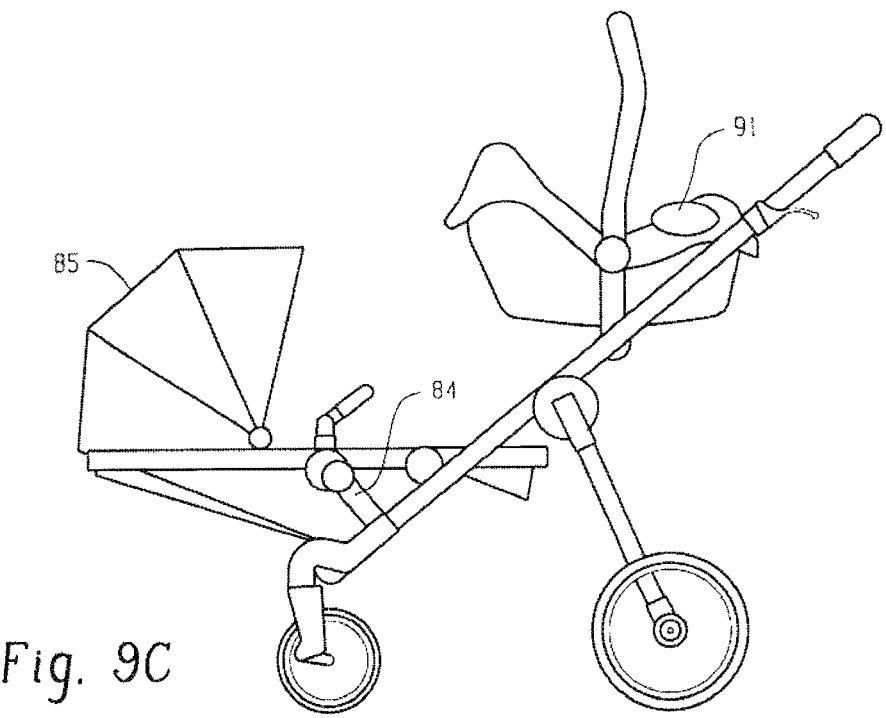
Figure 9D:
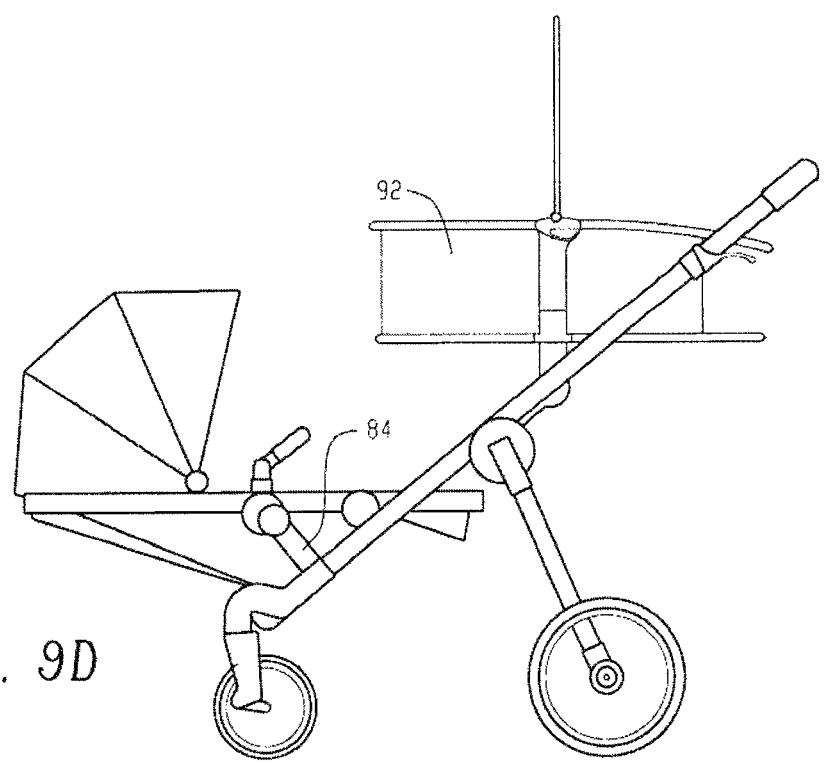
Figure 9E:
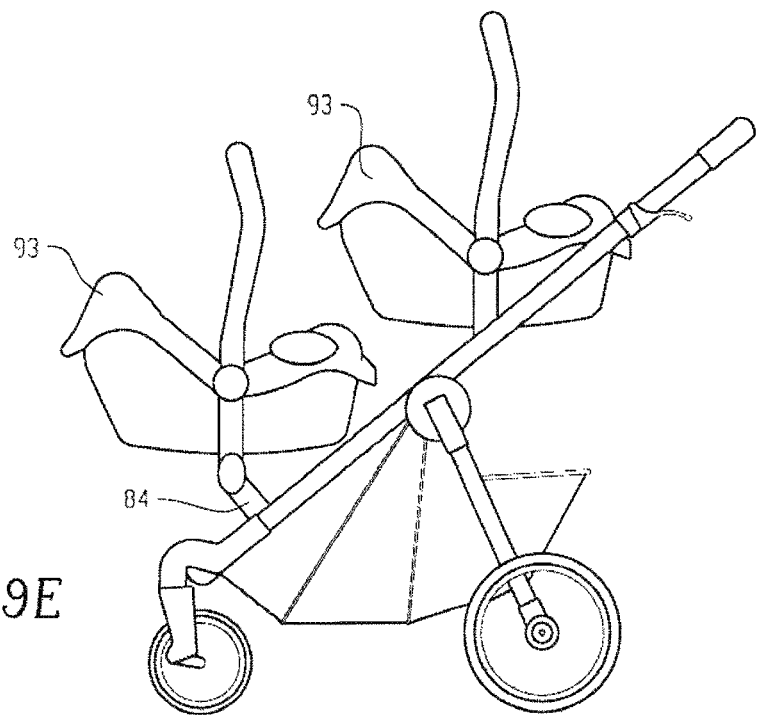
Figure 9F:
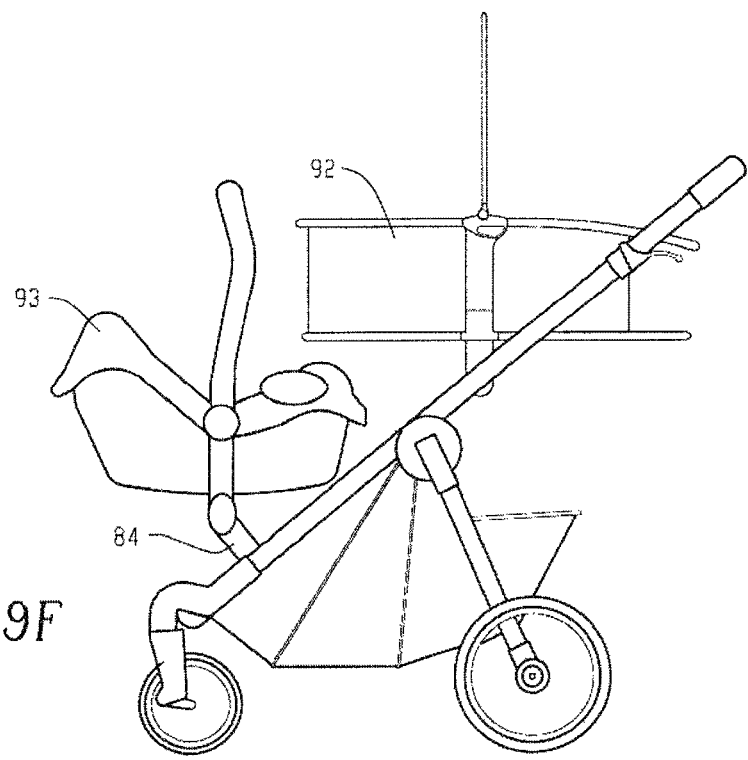
Figure 10:
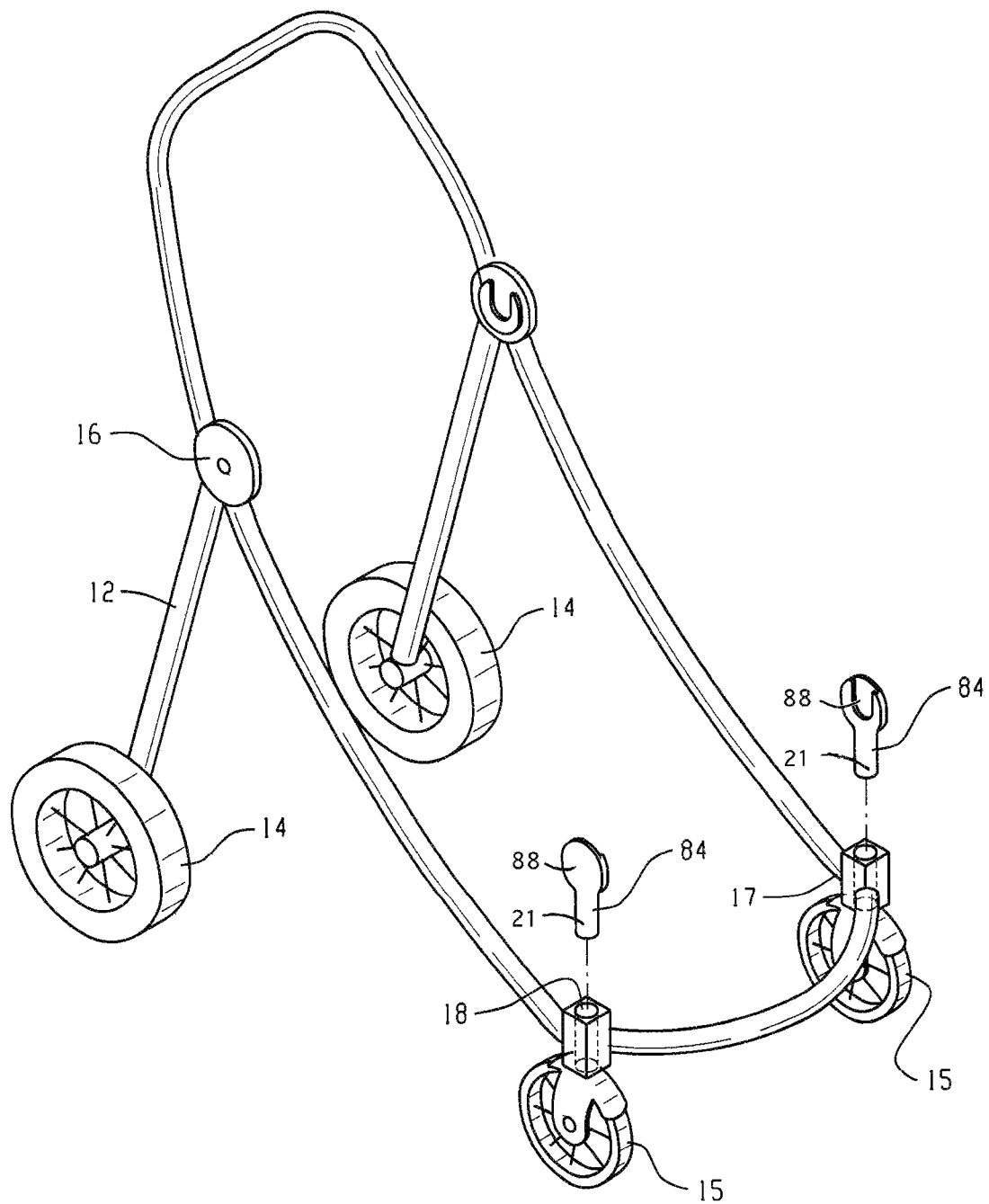
FIG. 10 shows a stroller with left and right attachment frame members for attaching a second seat.
Figure 11:
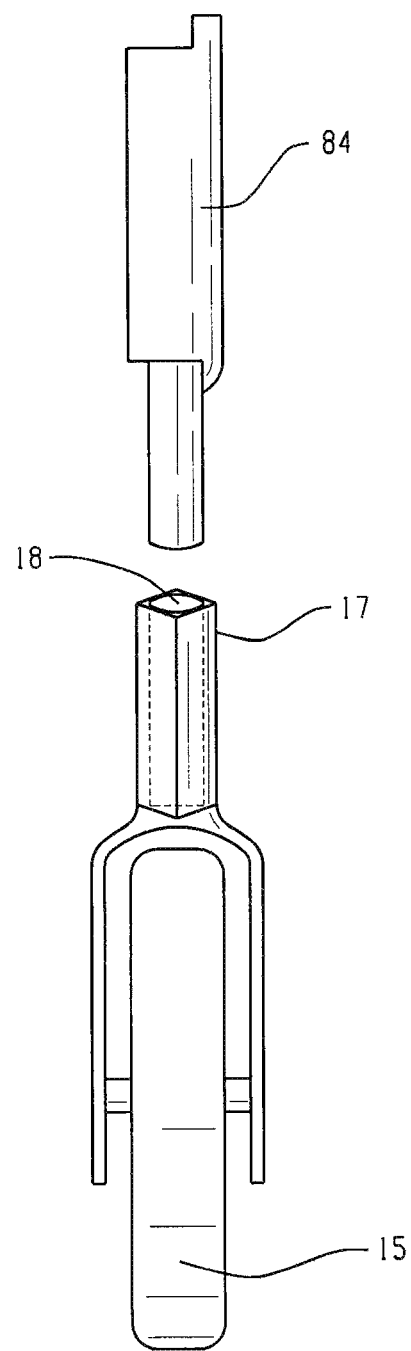
FIG. 11 shows an attachment frame member with a cylindrical post to be received in a slot in a stroller frame.

Stroller 80 comprises a stroller seat 86. The stroller seat 86 is located adjacent to handle portion. The stroller seat 86 may be fixedly attached or removably attached to frame 81. In embodiments of the stroller 80 wherein stroller seat 86 is removably attached to frame 81, the stroller seat 86 may be removed and replaced in a backward facing configuration with a second stroller seat 85 connected with seat attachment 84, see FIG. 9A, the second stroller seat be replaced by a infant carrier 93 and the stroller seat facing forward, see FIG. 9B or the child carrier 91 may be positioned in the first seat position and the stroller seat 85 in the second seat position, see FIG. 9C, or the child carrier 91 may be replaced with a pram 92, see FIG. 9D. In another configuration of the double stroller, two child carriers 93 may connected to the stroller frame 81, see FIG. 9E, or one of the child carriers 93 may be replaced with a pram or bassinet 92 as shown in FIG. 9F. Embodiments of the stroller 80 may comprise a second seat support element 89 adjacent to the handle portion. A stroller 80 comprising a second seat support element 89 allows the seat to be easily removed and reconfigured to a different orientation or replaced with a different style seat as shown in FIGS. 9A to 9F.

Embodiment of the stroller 80 comprises a first seat support element 84. The seat support element 84 is connected to the stroller 80 front wheel support frame 81a. The seat support element 84 is adjacent to the front wheel support portion 81a of frame 81. The seat support element is capable of supporting a second stroller seat 85 in front of the stroller seat 86. This provides convenience and versatility to a user of stroller 80. Seat support element may be fixedly attached or removably attached to front wheel support portion 81a. The front seat 85 may be positioned substantially over the front wheels so the stroller remains stable. Preferably, the seats should be positioned such that the center of gravity of the stroller is between the front and rear wheels. If not an additional wheel may be placed on the attachment as previously described. Seat support element 84 comprises a seat connector 88. Seat connector 88 may be a multipurpose general connector that allows different seats to be interchanged on the seat support element 84. Any style seat may be configured to connect to the seat connector, such as but not limited to, a stroller seat, a baby seat, a bassinet, a pram, a baby carrier, or a car seat, for example.

An embodiment of the stroller attachment comprises a connector portion, and a seat support element. The connector portion is capable of connecting the seat attachment to the frame.

In the embodiment shown in FIG. 8, stroller 80 comprises a first stroller seat 86 and a second stroller seat 85. Stroller seat 86 is shown in the forward facing configuration and second stroller seat 85 is shown in a backward facing configuration. The seat support element 84 is capable of supporting the seat above the front wheel 82 connected to the wheel support portion 81a. Preferably, the front seat is located substantially over the front wheels and the back seat is located substantially over the rear wheels.

Though it can not be seen in the side view of FIG. 8, a typical embodiment of the stroller will comprise two seat connector portions. One seat connector portion will support each side of the seat. The connector portion may be one piece or multiple parts.

FIGS. 9A through 9F show various configurations that are possible with the stroller of the invention. These configurations are not to be considered to be all available configurations of the stroller and one skilled in the art would recognize many additional possibilities based upon this specification and set of drawings. From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A stroller, comprising:
a stroller frame;
a plurality of wheels comprising a plurality of front wheels and a plurality of back wheels;
a first seat coupled to the stroller frame at a first vertical position of the stroller frame closer to a handle of the stroller and configured to hold a first child in the stroller;
a second seat attachment coupled to the stroller frame at a second vertical position substantially below the first vertical position and closer to the front wheels and comprising:
a left seat support element, wherein the left seat support element comprises:
a first connector portion releasably connected to the stroller frame closer to a left front wheel and a left seat connector releasably connecting a second seat in either a forward or backward position; and
a right seat support element, wherein the right seat support element comprises:
a second connector portion releasably connected to the stroller frame closer to a right front wheel and a right seat connector releasably connecting the second seat in either a forward or backward position between the left and right seat connectors; and
the second seat releasably connected to the left seat connector and the right seat connector and configured to hold a second child in the stroller while the first seat holds the first child.

2. The stroller of claim 1, wherein the second seat is a baby seat, a car seat, a stroller seat, a bassinet, a baby carrier, or a pram.

3. The stroller of claim 1, wherein each of the left and right seat support elements has a first end and a second end.

4. The stroller of claim 3, wherein the first end comprises the connector portion and is releasably connected to the stroller frame.

5. The stroller of claim 4, wherein the second end comprises the seat connector and is releasably connected to the second seat.

6. The stroller of claim 1, wherein both the first connector portion and the second connector portion releasably connect to the stroller by at least one of buttons, snaps, friction fittings, interference fits, threaded connections, locking tabs, or keyed connections.

7. A stroller, comprising:
a stroller frame;
a plurality of wheels comprising a plurality of front wheels and a plurality of back wheels;

a first seat coupled to the stroller frame and disposed along a first vertical position of the stroller frame closer to a handle of the stroller, the first seat configured to hold a first child in the stroller;

a second seat attachment coupled to the stroller frame closer to the front wheels and comprising:

a left seat support element, wherein the left seat support element comprises:

a first connector portion releasably connected to the stroller frame closer to a left front wheel and a left seat connector releasably connecting a second seat in either a forward or backward position; and a right seat support element, wherein the right seat support element comprises:

a second connector portion releasably connected to the stroller frame closer to a right front wheel and a right seat connector releasably connecting the second seat in either a forward or backward position between the left and right seat connectors; and the second seat releasably connected to the left seat connector and the right seat connector and positioned at a second vertical position substantially below the first vertical position of the first seat, the second seat configured to hold a second child in the stroller while the first seat holds the first child.

* * * * *